June 12, 1934.  V. CZERWENY  1,962,638
BOX MAKING MACHINE
Filed May 14, 1930   12 Sheets-Sheet 1

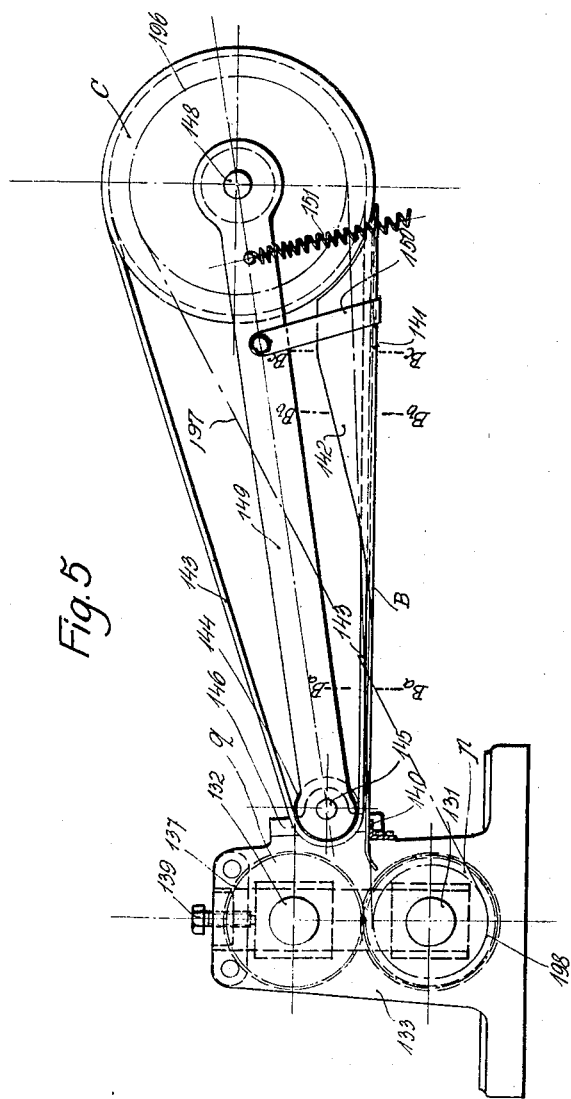
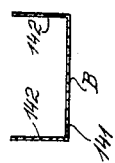

June 12, 1934.  V. CZERWENY  1,962,638

BOX MAKING MACHINE

Filed May 14, 1930  12 Sheets-Sheet 6

Inventor:
Viktor Czerweny

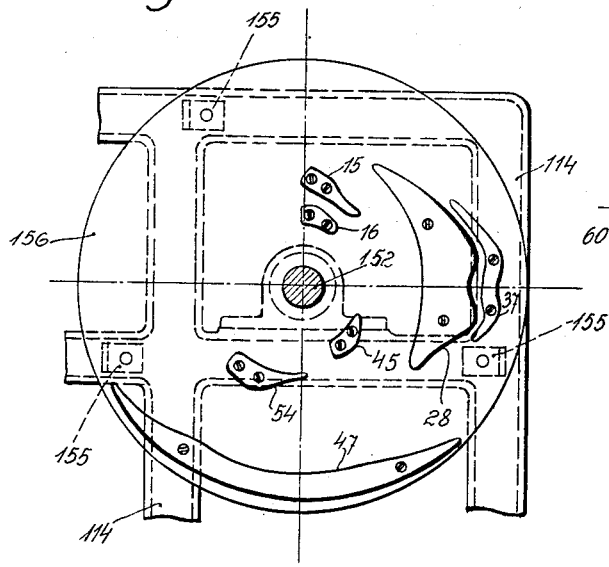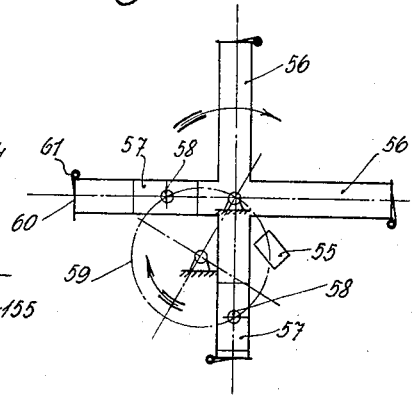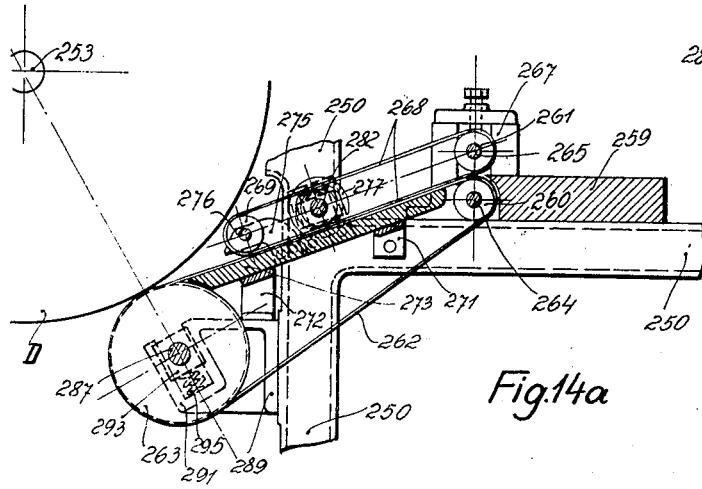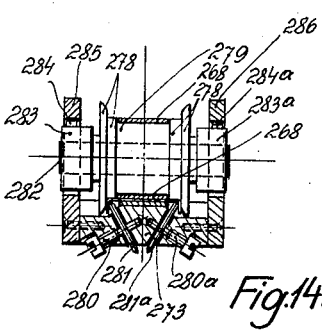

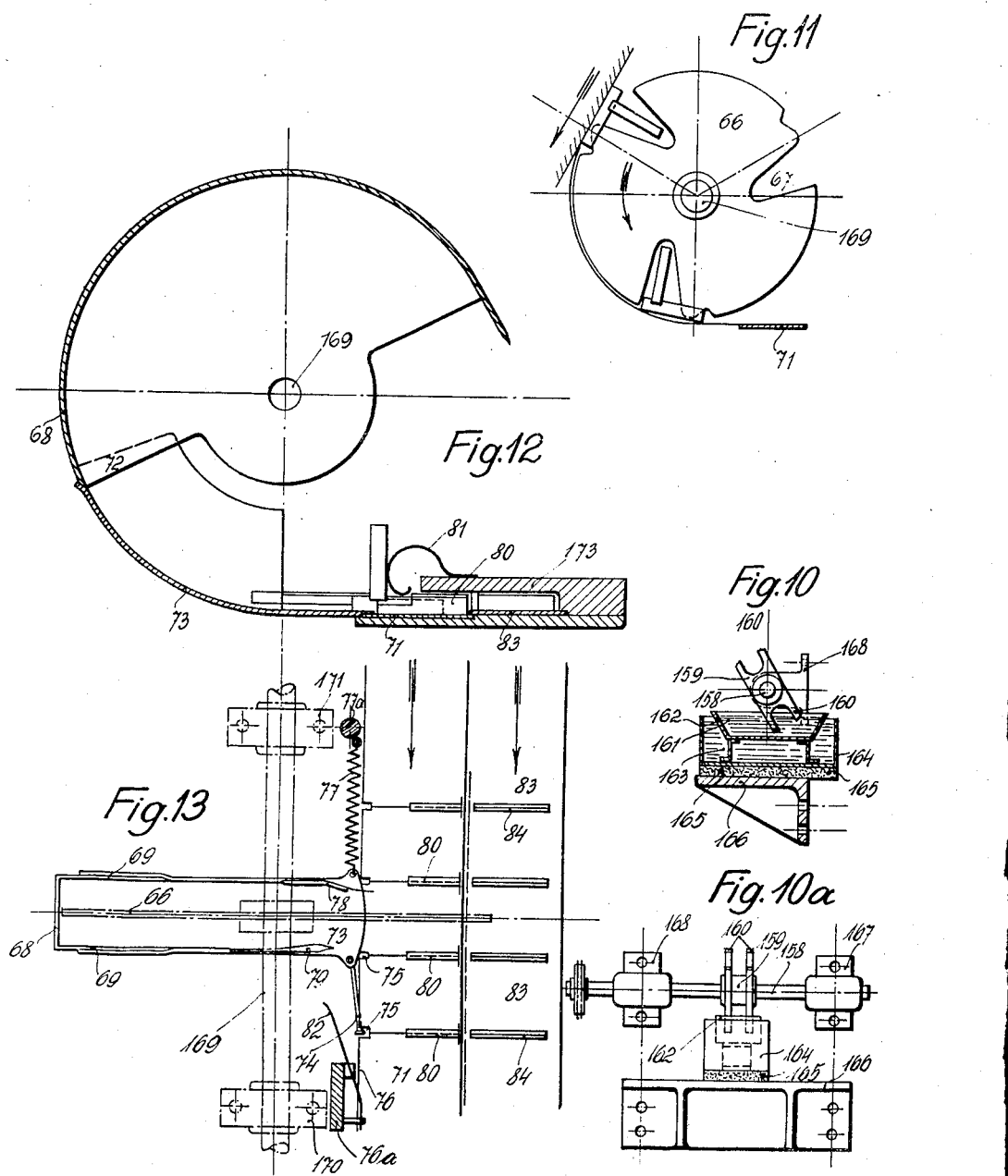

June 12, 1934.    V. CZERWENY    1,962,638
BOX MAKING MACHINE
Filed May 14, 1930    12 Sheets-Sheet 9

June 12, 1934.   V. CZERWENY   1,962,638
BOX MAKING MACHINE
Filed May 14, 1930   12 Sheets-Sheet 10

Inventor:
Viktor Czerweny
By Pennie Davis Marvin & Edmonds
attorneys

June 12, 1934.  V. CZERWENY  1,962,638
BOX MAKING MACHINE
Filed May 14, 1930   12 Sheets-Sheet 11
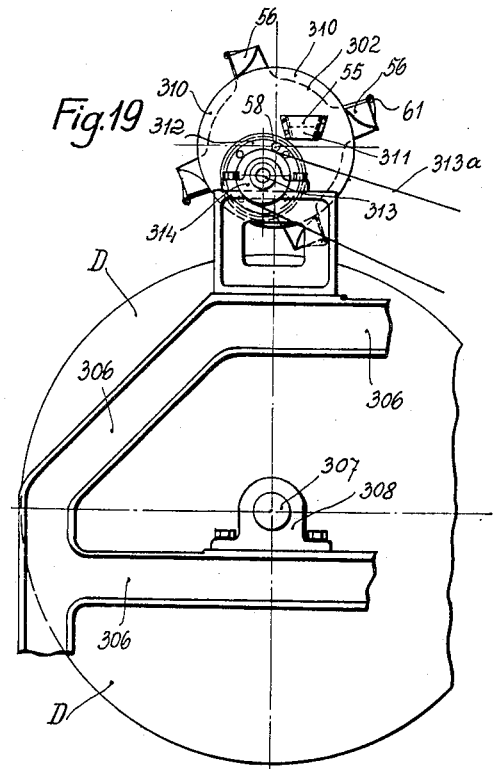
Fig.19
Fig.20
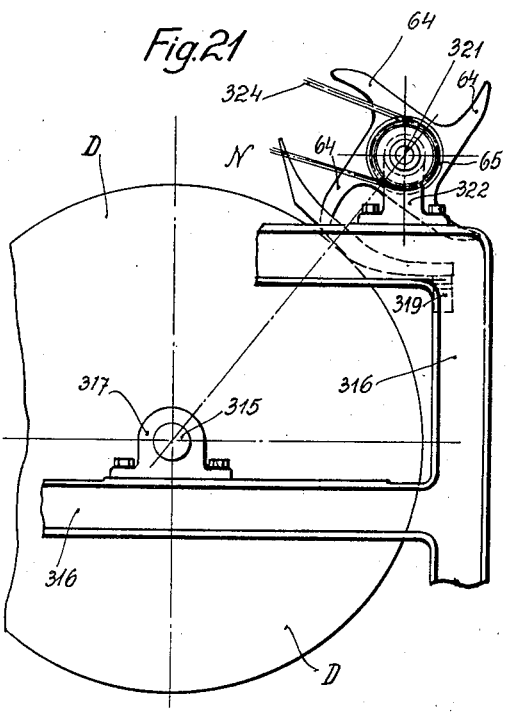
Fig.21
Fig.22

June 12, 1934.     V. CZERWENY     1,962,638
BOX MAKING MACHINE
Filed May 14, 1930     12 Sheets-Sheet 12
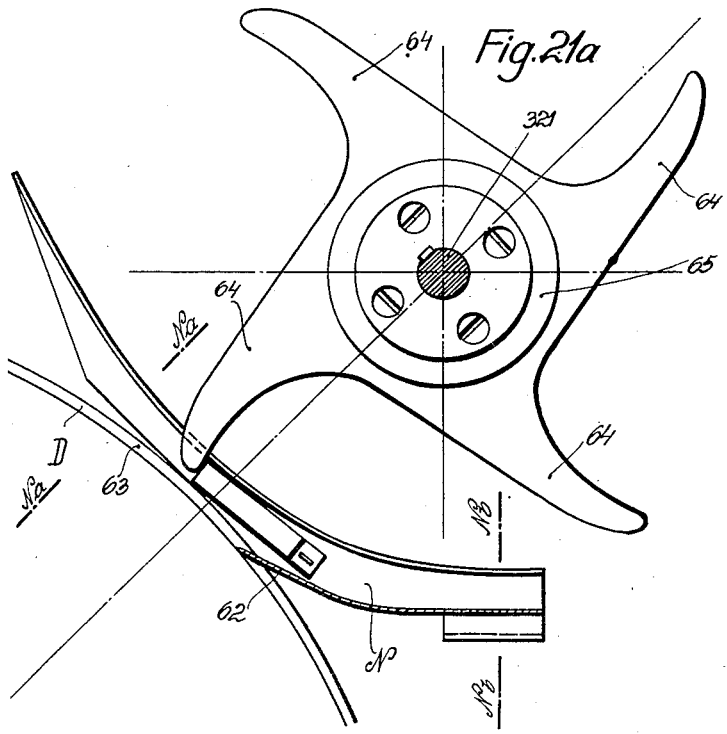
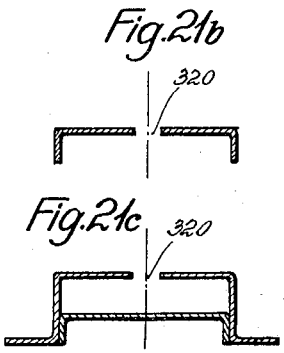
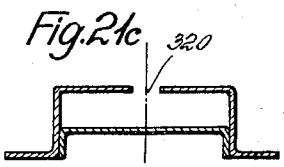
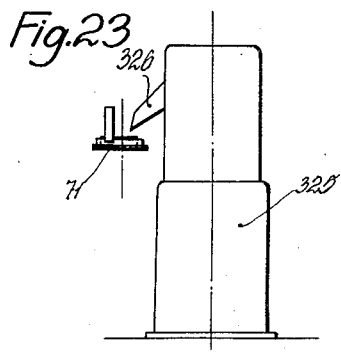
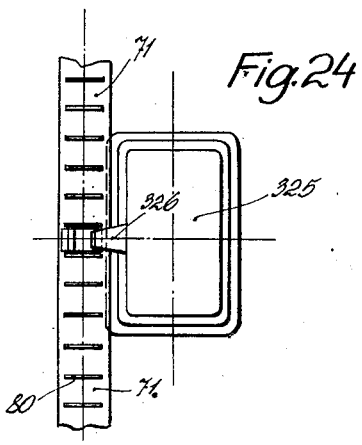

Patented June 12, 1934

1,962,638

UNITED STATES PATENT OFFICE 1,962,638

BOX MAKING MACHINE

Viktor Czerweny, Waltendorf, near Graz, Austria

Application May 14, 1930, Serial No. 452,326
In Austria May 23, 1929

28 Claims. (Cl. 93—2)

This invention relates to a machine for the making and filling of cardboard boxes or portions thereof, and has for its object to facilitate the mass-production of these articles.

The usual procedure in the manufacture of cardboard box parts is first to produce a flat trimmed blank having the form of the evolved surfaces of the part in question in which the edges of the box are impressed, slit, grooved, or cut, and then to form up this blank to the required part of a box (or to the required one-piece box) by suitable operations carried out in succession or simultaneously, such as folding, bending, clamping, sticking, cutting, and the like. The present invention also enables the box to be filled immediately after manufacture and to be delivered on to a stack.

In the already known devices for the continuous production of cardboard boxes either the portions of the mechanism which carry out the individual operations are stationary while the work piece (box blank or semi-finished box) travels from portion to portion of the mechanism, or the mechanism and implements are caused to pass by the stationary work piece in the correct order, each portion of the mechanism and each implement carrying out the operations appropriate thereto in the course of movement. The proposal has also been made to allow the work piece to be carried on a conveying device and to be operated upon by an implement or implements likewise mounted upon a conveying device.

These arrangements, which are bulky and comparatively slow in action, are improved upon by the device provided by the present invention in which all or some of the implements or parts of mechanism which carry out the individual operations are caused to travel together with the work piece on which they operate, so that these parts of mechanism or implements are to a certain extent combined at a common seat of operation which itself moves forward together with them and with the work piece. More precisely, the parts of mechanism and implements are mounted on a travelling table, revolving table, rotating drum, or the like, and the work piece is also attached to this working base during the process of manufacture. In the course of the movement of the table (rotation of the drum) the implements carry out their operative movements in the appropriate pre-determined order or in certain cases and under certain circumstances simultaneously. It has proved advisable to provide in conjunction with one travelling table several centers of operation, each of which is equipped with a set of the above-mentioned mechanical parts or implements and grasps a work piece, so that several boxes can be made simultaneously in one machine. It is also possible within the scope of the present invention to provide implements or mechanical elements arranged fixed in a certain order along the edge of the travelling table and adapted to carry out their respective operations as the work piece is carried past them, their moving parts being synchronized with the work piece. In particular the processes of sticking, fastening, and filling the boxes can be advantageously carried out in this manner, and it is therefore possible to retain the work piece clamped to the travelling table throughout the entire process up to the completion of the empty or filled box.

The arrangement of the operative parts and of the work piece upon a common travelling table in accordance with the invention not only enables a considerable saving of space and time to be effected in the mass-production of cardboard boxes but also ensures a high degree of accuracy in the work performed. A further gain resulting from the invention is the ability to produce and fill the boxes without causing any deformation of the latter, which circumstance taken in conjunction with the possibility, also provided by the invention, of setting up the box-making machine in direct conjunction with the machine manufacturing the material or goods intended to be packed in the boxes results in the possibility, not hitherto achieved, of combining in one unbroken process and in one coordinated set of machinery the whole of the operations implied in the manufacture and filling of cardboard boxes starting with the raw materials required and ending with the finished filled boxes. The machine provided by the invention also embodies an automatic gauging device for the semi-finished or finished boxes which enables the rejections to be removed while the machine is running, so that the production of accurately made and filled boxes is ensured. It is further possible with my machine to make boxes of the type in which the body and the lid are formed of one piece and also boxes with an inserted sleeve overlapped by the lid, in both cases in a single continuous process from the raw material to the finished filled box. In this connection, and as a result of the inclusion of the filling process as an integral part of the series of operations performed, the opening or removing of the lids of the finished boxes before filling, which is necessary with the machines hitherto known, is rendered unnecessary by my machine.

In the following detailed specification some examples of the practical embodiment of the invention in the form of box-making machines, in which the travelling work-base is a revolving drum, constructed to make a one-piece cardboard box of the design shown in Fig. 2, and the mode of operation of the same, will be described with reference to the figures of the accompanying drawings, in which:—

Figure 2:
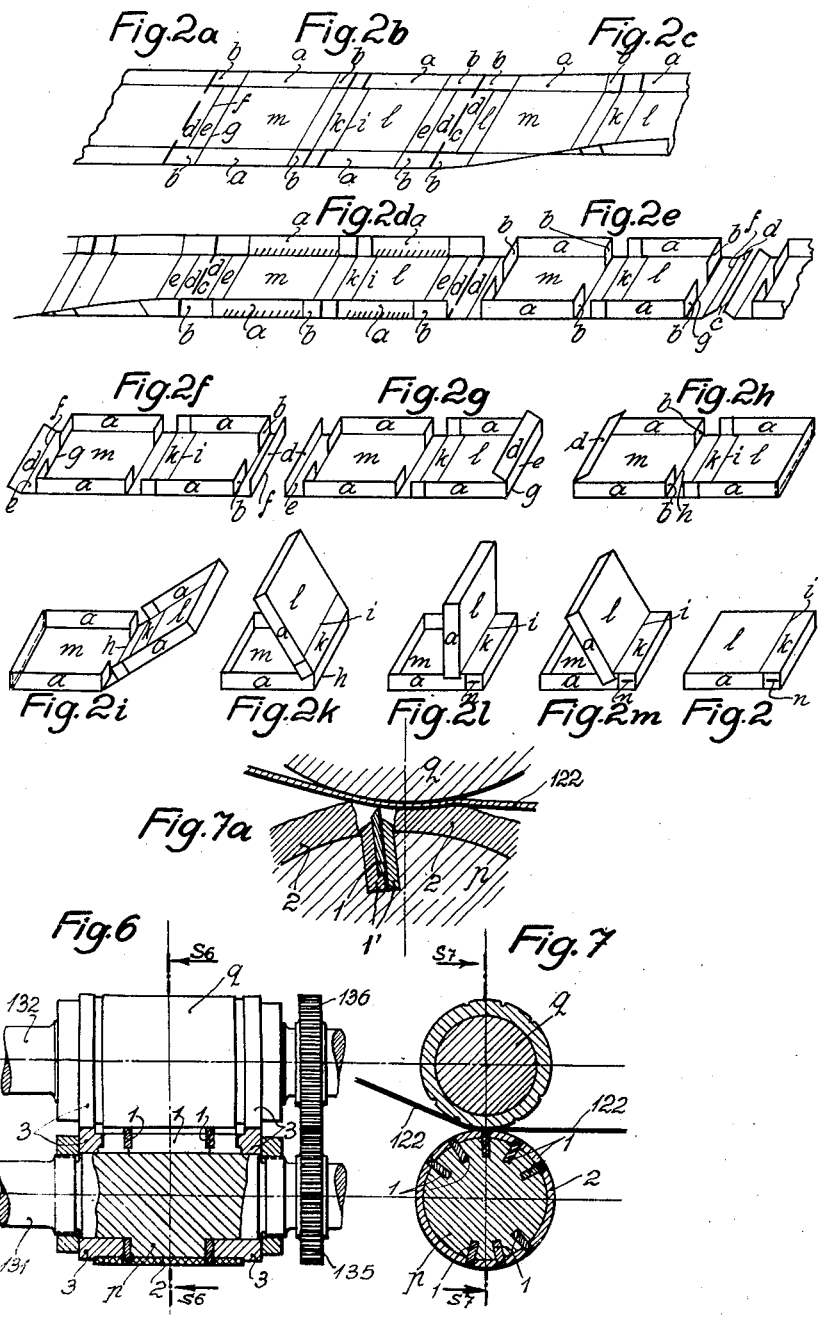
Fig. 2 shows a box which may be produced on a machine according to the invention.

Figs. 2a–2m illustrate in perspective views the development of the box shown in Fig. 2, there being illustrated in particular by Fig. 2a, the unscored strip of material, by Fig. 2b, this strip after having been scored and incised, by Figs. 2c and 2d, the strip during and after the bending up of the side surfaces, by Fig. 2e, the same strip after the front flaps have been tucked in, by Fig. 2f, the work piece shown in Fig. 2e, but after having been severed from the integral strip, by Figs. 2g and 2h, the severed work piece during successive phases of folding the front surfaces, by Figs. 2i and 2k, the same piece during successive phases of folding up the lid of the box about the rear edge $h$, by Fig. 2l, the work piece or box after the lid has been subdivided by a hinge, and by Fig. 2m, the finished box before being closed.

Figure 3:
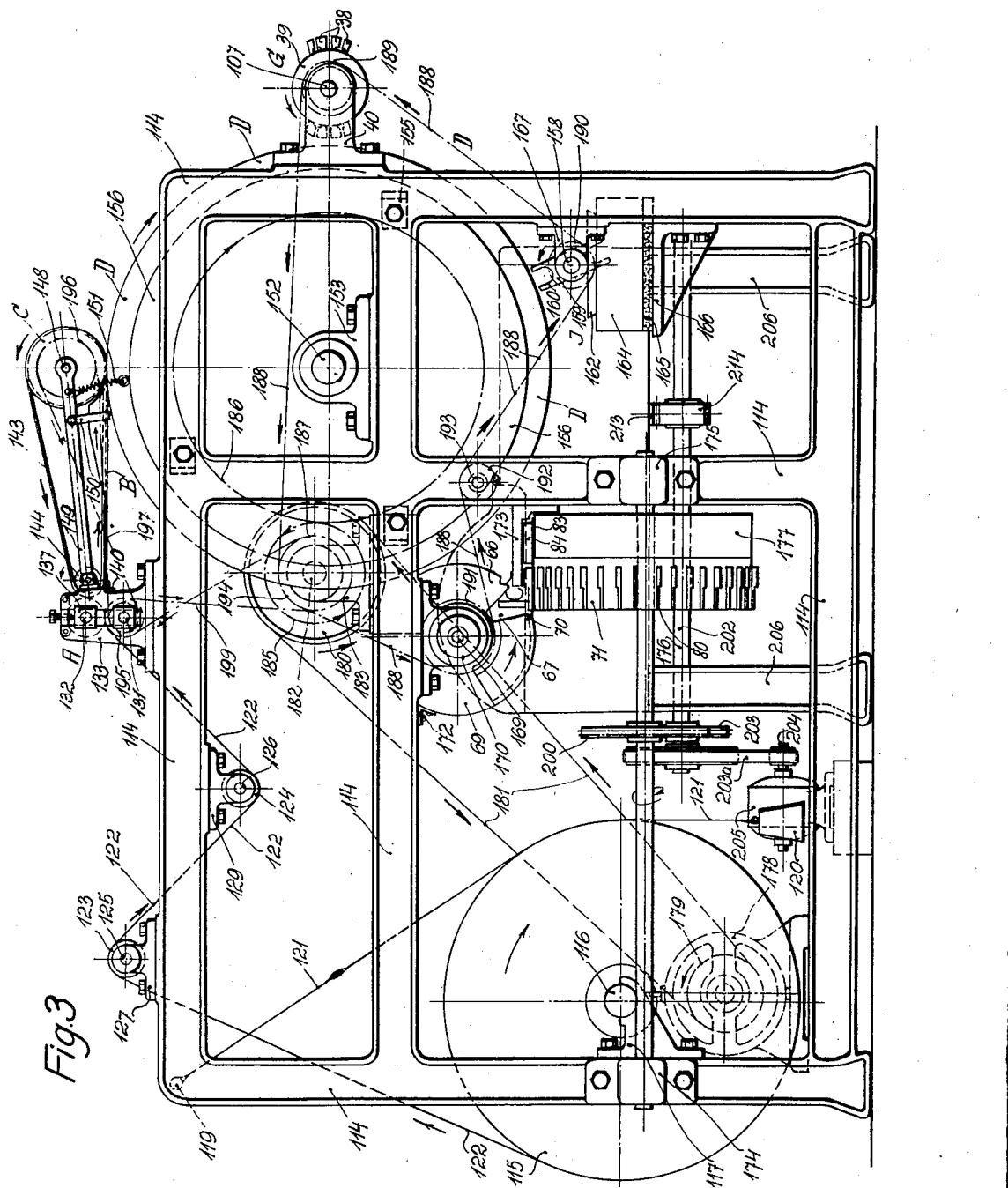

Fig. 3 is a side elevation of a complete machine.

Figure 4:
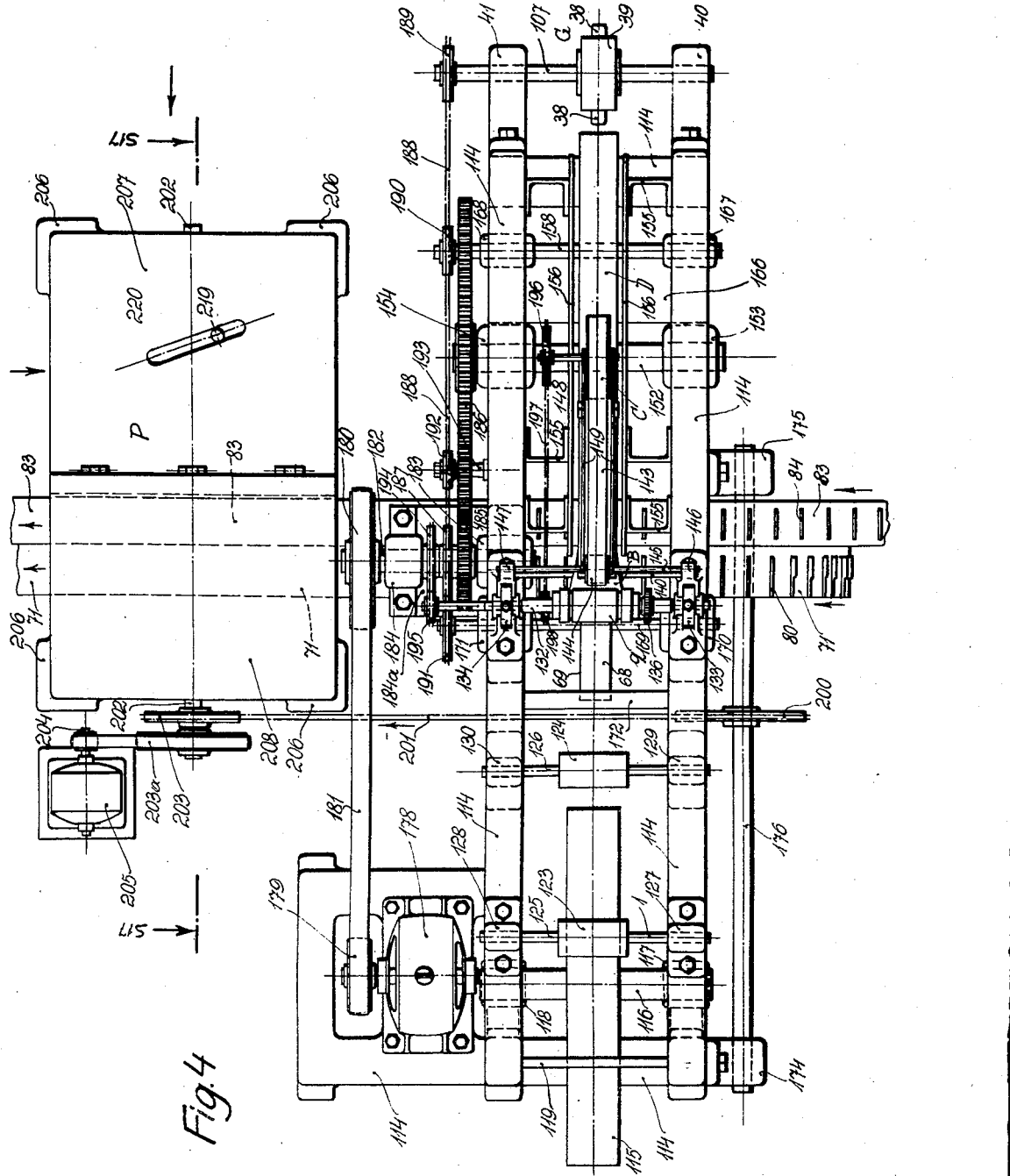

Fig. 4 is a plan to Fig. 3.

Figs. 5–13 and 16–18 show, partly on an enlarged scale, details of the machine shown in Figs. 3 and 4.

Fig. 5 shows an elevation of the scoring, grooving, and cutting device A and the devices for the feeding of the work piece up to the drum D.

Figs. 5a, 5b and 5c are sections through the guiding channel B taken on the lines $Ba$—$Ba$, $Bb$—$Bb$, and $Bc$—$Bc$.

Fig. 6 is a side elevation of the device A in part section on the line $s_7$—$s_7$ of Fig. 7 with the bearings omitted.

Fig. 7 is a section on the line $s_6$—$s_6$ of Fig. 6.

Fig. 7a shows a detail of Fig. 7 on an enlarged scale.

Figure 8:
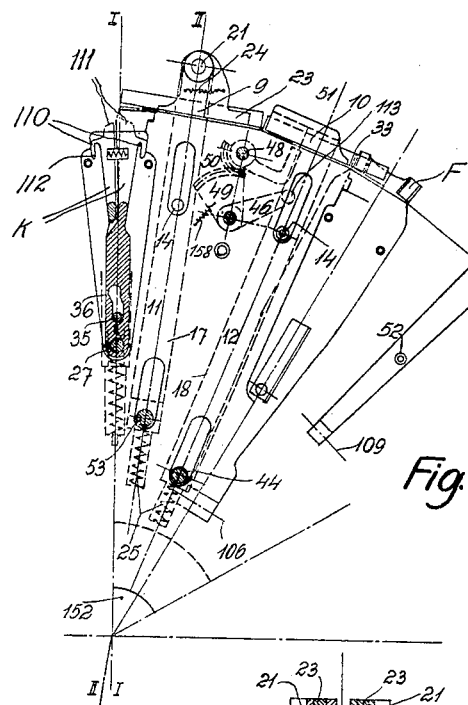

Fig. 8 shows on an enlarged scale a sector of the drum D with the devices pertaining thereto.

Figure 8A:
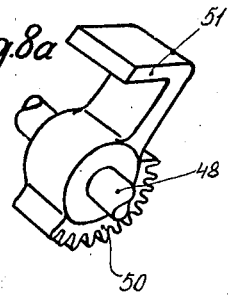

Fig. 8a is a perspective view of the lid-forming finger 51.

Figure 9A:
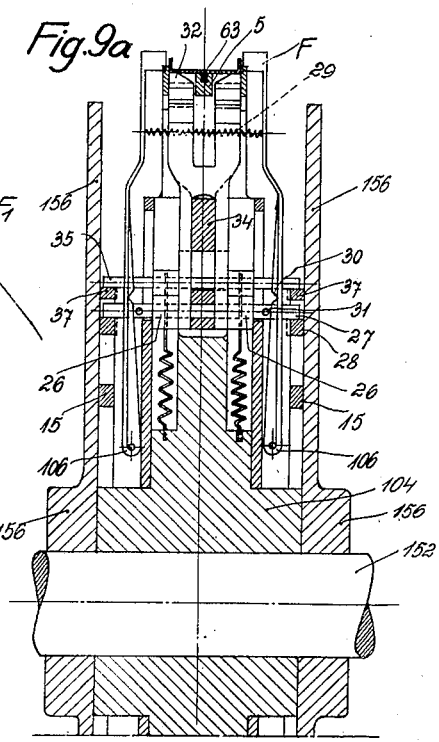
Figure 9:
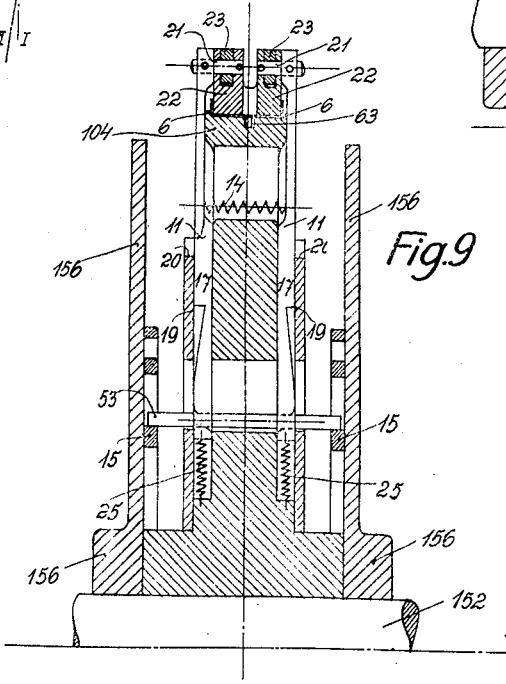

Fig. 9 is a section on the line II—II of Fig. 8, and

Fig. 9a a section on the line I—I of Fig. 8, while in

Figs. 9 and 9a the cam discs 156 are shown.

Fig. 9b shows in elevation a cam disc 156 and the mode of attachment to the framework of the machine.

Figs. 10 and 10a are a longitudinal section and a side elevation respectively of the pasting device J.

Fig. 11 shows the detacher disc 66 and the functioning of the same.

Figs. 12 and 13 show in elevation and plan elevation respectively the device for the transference of the boxes from the drum D to a conveyor 71.

Figure 14:
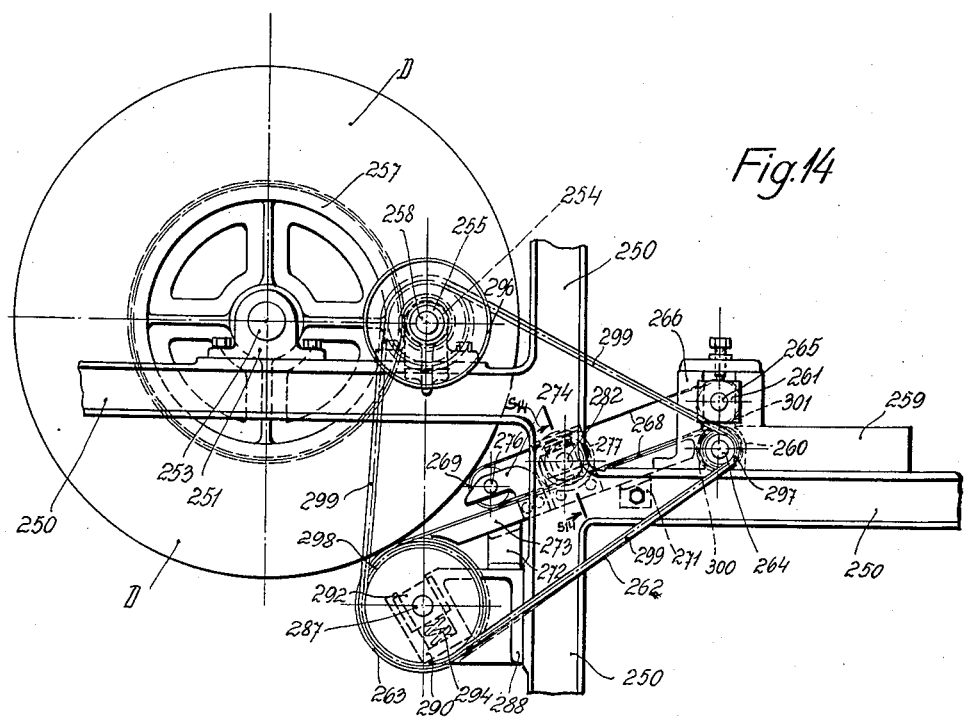
Figure 15:
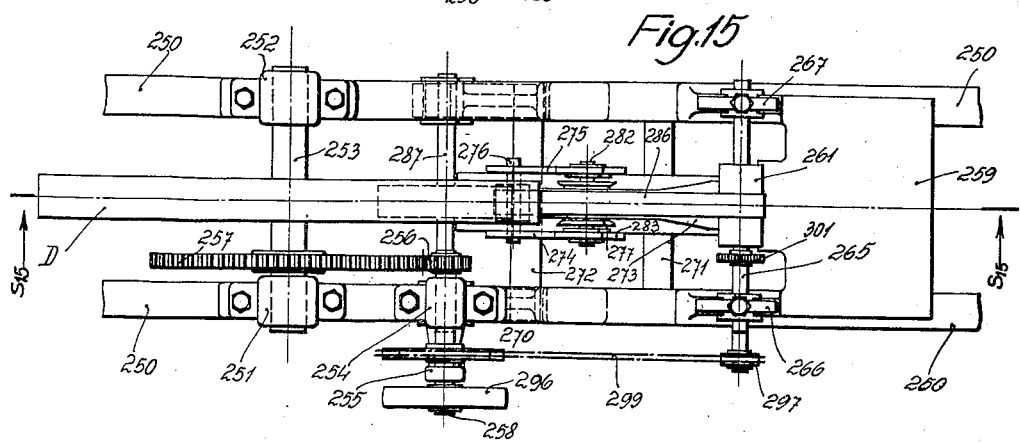

Figs. 14 and 15 show in side and plan elevation respectively a device for the conveyance and attachment of box blank portions to the travelling drum.

Fig. 14a is a section on the line $s_{15}$—$s_{15}$ of Fig. 15.

Fig. 14b is a section on line $s_{14}$—$s_{14}$ of Figs. 14, 15.

Figure 16:
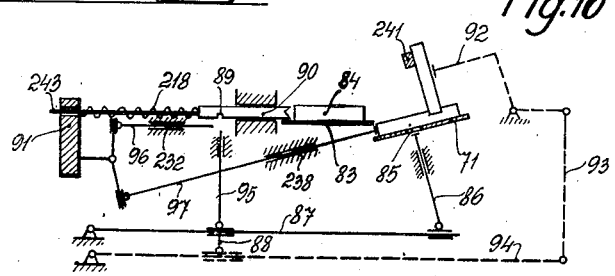

Fig. 16 is a diagrammatic representation of the overfilling and gauging device P of the box-making machine shown in Figs. 3 and 4.

Figure 17:
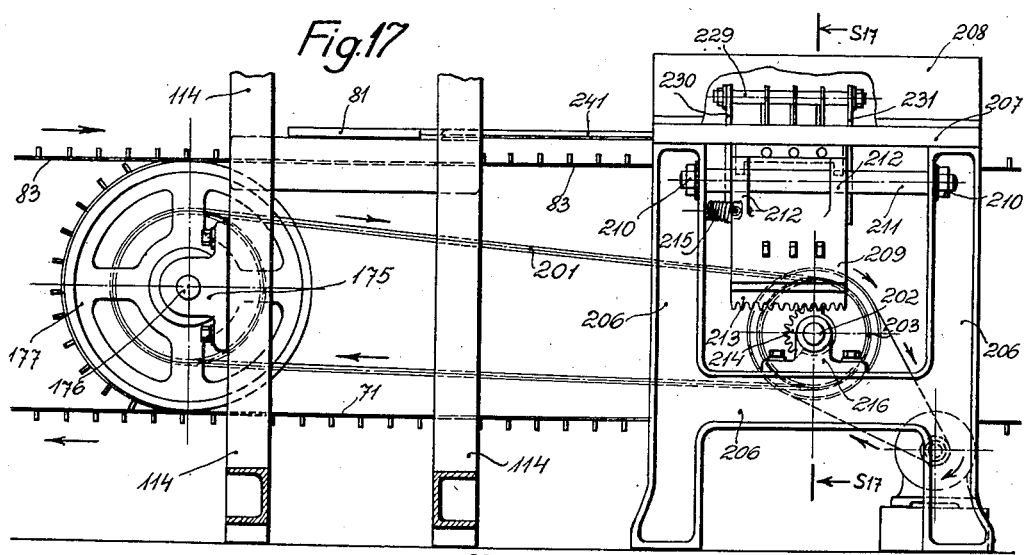
Figure 18:
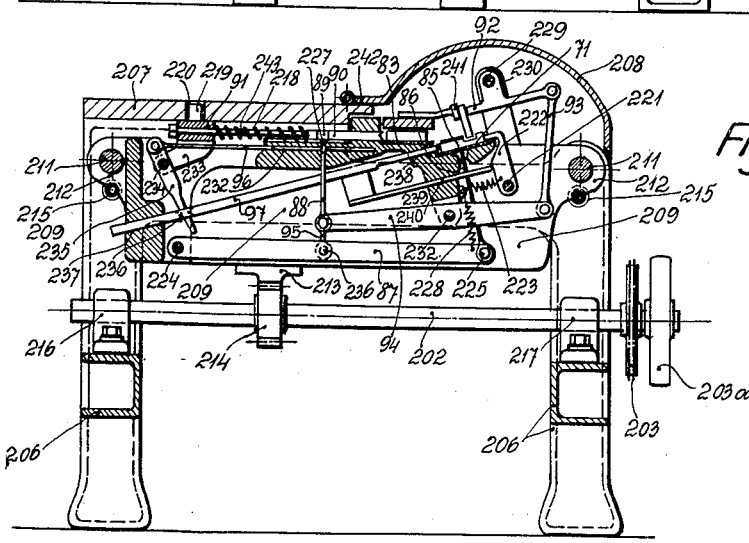

Fig. 17 is a side elevation and Fig. 18 a section on the line $s_{17}$—$s_{17}$ of Fig. 17 of the device P.

Figs. 19 and 20 show in side elevation and plan elevation respectively a device for the filling of the boxes while attached to the drum.

Fig. 19a is a simplified diagrammatic side view of the filling device shown in Figs. 19 and 20.

Figs. 21 and 22 show in side and plan elevation respectively a device for the simultaneous closing and detachment of the boxes from the drum, and Fig. 21a parts of this device on an enlarged scale.

Figs. 21b and 21c are cross sections of the closer N on the lines $N_a$—$N_a$ and $N_b$—$N_b$ respectively.

Figs. 23 and 24 are a side and a plan view respectively of a device for the direct filling of the boxes travelling on the conveyor belt 71 from a machine producing the filling material or goods.

For the better understanding of the mode of operation of the machine an outline of the method employed in the production of a closed one-piece cardboard box of the type shown in Fig. 2 (or of an open box of the type shown in Fig. 2m) will first be given. From the strip of material indicated in Fig. 2a or from a section of this strip the box blank shown in Fig. 2b is first made, this blank being merely the evolution of the surfaces of a box (Fig. 2m or Fig. 2) in a plane. In this blank (Fig. 2b) scores corresponding to the edges of the box are either lightly scratched (indicated by thin lines in the drawing) or more deeply cut (thick lines in the drawing) according to whether the material of the box in the finished state is to be merely cracked or carefully incised at the edge in question. The box blank (Fig. 2b) then undergoes the process of formation, the sides $a$ being first bent up as indicated in Figs. 2c and 2d, whereby the blank need not yet be severed from the strip of material or from the series of blanks. During the subsequent phases of the process of formation the work piece is clamped to the travelling table (or drum) at the sides $a$ shown shaded in Fig. 2d; if desired headers or holding dies can be employed, which are clamped down on to the floor surface $m$ and the lid surface $k$, $l$ of the box, and hold the latter in position as long as possible. In the next phase of the process of formation (see Fig. 2e) the flaps $b$ are tucked in and the work piece, if necessary, is severed on the line $c$ from the next following work piece or from the strip of material. The end surfaces $d$ and $e$ are then folded up and over (see Figs. 2f–2h), the flap $d$ being first folded up on the edge $f$, the flap $e$ folded up on the edge $g$, and finally the flap $d$ folded over on to the inside surface of the box. The two coherent portions of the box, namely the body and the lid have now acquired their correct form, and merely require to be fastened or stuck (the gum or other sticking medium can have been applied at an earlier stage) and brought into their required respective positions. This is effected, as indicated in Figs. 2i and 2k, by the folding up of the lid about the rear edge $h$. In the surface of the lid and edge $i$ is scored and destined to be broken in the next phase of the process of formation, so that the box acquires the form shown in Fig. 2l and the lid is sub-divided into a fixed lid portion $k$ and a hinged portion $l$ folded along the edge $i$. The fixed lid portion $k$ is clasped or stuck to the body of the box at $n$ (see Fig. 2m), and finally the boxes, either after having been filled or in the empty state, are closed down (see Fig. 2).

Figure 1:
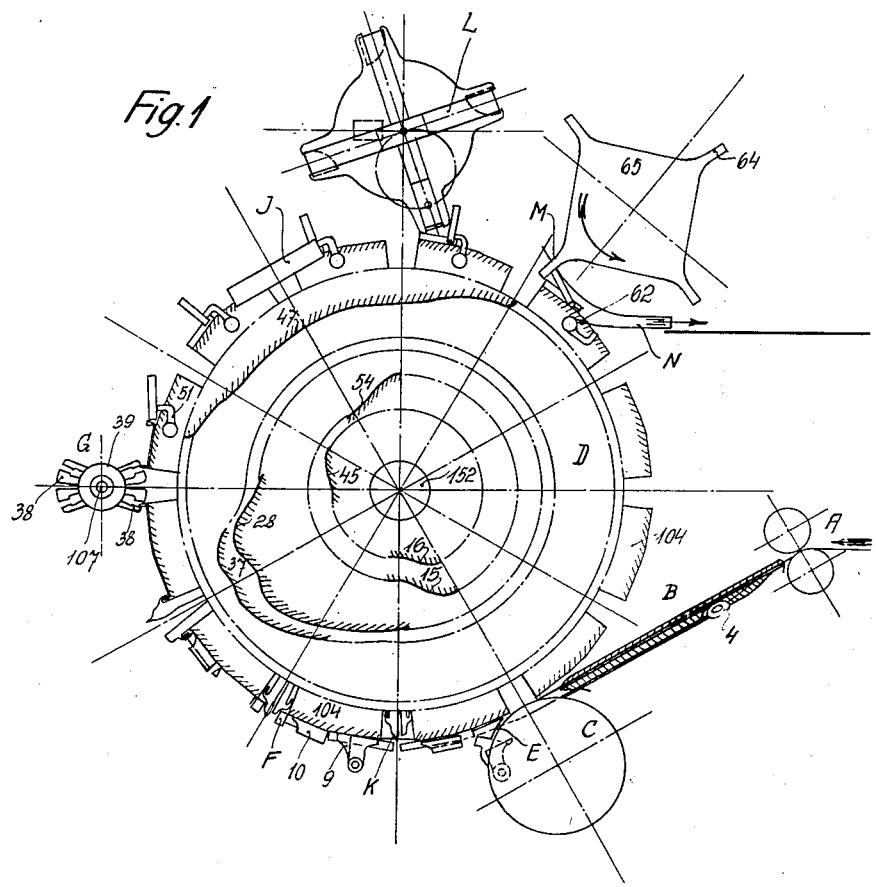
Fig. 1 is a diagram of the lay-out of a machine in accordance with the invention.

Before the detailed description of constructional examples of the box-making machine provided by the present invention the main principles of the working of this machine will be described with reference to Fig. 1 of the drawings, which illustrates diagrammatically the general lay-out of a machine embodying the characteristic features of the invention and adapted to carry out the above-described process of manufacture. With reference to this Fig. 1, the strip of material, cardboard or the like, is fed in the direction of the arrow into the scoring and cutting device A which provides it with the incisions and scorings shown in Fig. 2b, so that a series of box blanks worked into the strip after the fashion of Fig. 2b leave the scoring and cutting device. The thus prepared strip then passes between the guides B in which the side portions of the box are turned up in the manner shown in Figs. 2c and 2d by means of the sheared up side walls of this guiding channel and with or without the cooperation of wheels 4 engaging from the inside. From the guiding channel B the strip travels on to the revolving drum D which consists of a number of sectors 104 (in the example shown in Fig. 1 there are twelve of these sectors). Each drum sector 104 is of similar construction and is equipped with a set of forming implements or devices which travels round integrally therewith during the rotation of the drum D. On the periphery of each drum sector there can be clamped one work piece which is brought up to the drum D by means of a roller C with or without the cooperation of a guide E. It will thus be clear that a number of boxes can be formed simultaneously on the drum D, this number being in general equal to that of the segments located between the feed device C and the delivery device N. Since all the sectors are similarly constructed and equipped a number of details are shown in the drawings for the sake of clarity as pertaining only to the one or to the other of the individual sectors. It is evident that these details and parts are to be assumed to pertain to all the sectors alike.

The coherent succession of blanks on reaching the drum D is clamped to the sectors by lateral guides at the positions indicated by shading in Fig. 2d and further by the clamping dies 9 and 10 (Fig. 1) which are applied to the surfaces m and l respectively of the box. The box blank thus fixed to the periphery of the drum is then severed from the strip of material or from the next following blank by the cutting edge of the head-piece K which is mounted on the drum sector and travels radially outwards, and is then subjected during the course of the further rotation of the drum to the progressive stages of the process of formation by the implements and devices acting in conjunction with the sector to which the same is attached. The sides b (Fig. 2e) are folded in by the folders F, while the bending up and over and the tucking in of the ends d, e is effected by the suitably constructed head-piece K, the folders F and the dies 9 and 10 serving meanwhile as supports. In the meantime the drum has rotated so far that the work piece has reached the stationary clasping device G mounted extraneously to the drum, this device being only rotatable about an axle 107 and adapted to fasten clasps in the tucked-in ends of the box. During the further rotation of the drum a finger 51 (Fig. 1) is caused to project through an opening in the periphery of the drum, folds the lid of the box up over the body (see Figs. 2i and 2k) and also doubles back the hinged portion l of the lid about the edge i, so that the box acquires the form shown in Fig. 2l. A stationary device J mounted outside the drum then effects the clasping of the fixed lid portion K to the body of the box (Fig. 2l) or the sticking together of these two portions of the box, after which the finished but still open box is conveyed by the further rotation of the drum to the filling device L which is mounted outside the drum and does not participate in the rotary motion of the same. After the completion of the filling process the box is closed by means of the closing device M while still on the drum, is then removed from the drum D by the detacher N and delivered on to a stack or on to a travelling belt or conveyor. It is clearly and expressly to be understood that the arrangement here described, as also the selection and order of the implements and individual devices employed, as shown in Fig. 1, represent merely one form of construction by way of example and can be varied in any desired manner within the scope of the invention according to the type, form, and material of the box or box part to be made, according to the nature of the filling, and according to how far the box is to be made on the machine, and so forth. The devices and implements indicated in Fig. 1 can in part be dispensed with or replaced by others; stationary devices and implements disposed around the edge of the drum may be mounted upon the drum itself, and certain of the devices described as being mounted upon the drum may be removed therefrom and mounted in a manner to be stationary; all the machines embodying these modifications will, however, come within the scope of my invention provided they exhibit the essential feature that at least a portion of the devices and implements participating in the cycle of operations by which the box is produced travel together with the work piece upon a travelling work-base which carries both these devices and implements and the work piece, for example a rotating drum, and that these devices and implements are capable of carrying out their respective operations in the required order and during the movement or movements of the travelling work-base.

Box-making machines and their accessories constructed in accordance with my invention will now be described in detail in regard to their construction and mode of operation and with reference to the remaining figures of the accompanying drawings, these machines being intended to serve merely as examples of the embodiment of the invention, which could also be carried out in a perfectly different manner without departing from the definition of the essential nature of the invention given.

Figs. 3 and 4 are general views in side elevation and plan elevation respectively of a box-making machine in which the forming of a box of the type shown in Fig. 2m is carried out upon a drum, and the empty open box is removed from the drum and filled during conveyance. The machine produces the box from the unworked strip of material up to the finished filled box; it can clearly also be used to produce unfilled open or closed boxes or can be arranged for the production of separate portions of a box.

The following figures show details of the box-making machine the general lay-out of which is shown in Figs. 3 and 4.

The framework 114 carries the different parts of the machine. The process of manufacture commences at the material roller 115 the axle 116 of which is mounted in the bearings 117 and 118 attached to the framework 114; as soon as one roll of material (cardboard or the like) has been used up the empty roller is lifted out of the roller-bearings 117 and 118 and removed, and a new roller wound with fresh material is inserted. A brake-weight 120 suspended from the framework 114 at 119 and attached to the wire cord 121, which latter is brought into contact with the outer surface of the roller 115, prevents the unintentional unwinding of the material on the roller 115.

The strip of material 122 is passed from the roller 115 over the rollers 123 and 124, the axles 125 and 126 of which are mounted in the bearings 127, 128 and 129, 130 attached to the framework of the machine, to the scoring, grooving, and cutting device A which at the same time effects the forward feed of the strip. (The material strip 122 is only shown in Fig. 3, but is omitted from Fig. 4 for the sake of clarity. The breadth of the strip is equal to that of the roller 115.)

The scoring, grooving, and cutting device A consists essentially of a pair of rollers through which the strip of material 122 is drawn. The superimposed axles 131 and 132 of these twin rollers $p$, $q$ are mounted in the bearings 133 and 134 mounted in the framework of the machine. The axle 131 of the under roller $p$ (cutting roller) is driven in a manner to be described later and transmits this drive through the intermediary of a pair of toothed wheels 135, 136 (Fig. 6) to the upper roller $q$ (pressure roller), which latter roller is mounted in the bearings 133 and 134 in such a manner as to be slidably displaceable, so that this roller is permanently in engagement with the under roller $p$ under inherent pressure. The axle 132 is provided with slides 137 (Fig. 5) which are adapted to slide in a vertical direction in the bearings 133 and 134; screws 139 serve to press the slides 137 and therewith the pressure roller $q$ downwards.

Figs. 6 and 7 show in detail the scoring, grooving, and cutting device with the omission of the system of bearings, Fig. 6 being a side elevation of the twin rollers in which the under roller is shown in partial section on the line $s_7$—$s_7$ of Fig. 7, while Fig. 7 is a transverse section to be read in conjunction with Fig. 6 and taken on the line $s_6$—$s_6$ of the latter figure; Fig. 7a shows on an enlarged scale that portion of Fig. 7 which illustrates how the knife is embedded in the cutting roller. Fig. 5 is an end elevation of the scoring, grooving, and cutting device.

As can be seen from Figs. 6 and 7 this device consists of two superimposed metal rollers $p$ and $q$ which are pressed together and through which the material strip 122 is drawn. The cutting roller $p$ is provided on its periphery (see Fig. 7a) with a number of scoring, grooving, or cutting knives 1, which run partly in the longitudinal direction and partly transversely to the material strip, and these knives are arranged on the periphery of the roller $p$ in such a manner as to effectuate the required cutting and scoring of the blank. The holders 1' of the blades are embedded in resilient material 2 which enables the material strip to come clear of the knives as the rollers revolve. Each holder 1' consists of two plates between which a blade 1 is firmly clamped. Since the manner of clamping the blade and the special construction of the holder are well-known, and do not constitute part of this invention, their detailed description and illustration in the drawings have been omitted. Pressure-absorbing rings 3 are provided for the purpose of ensuring a correct distribution of the pressure between the rollers $p$ and $q$. It is obvious that scoring or cutting knives can equally well be used in conjunction with this arrangement.

The strip of material, after having been worked up into box blanks in the scoring, grooving, and cutting device A, leaves this device and passes into the guiding channel B in which the side pieces are bent up on the way to the drum, and from the channel the work piece is moved on through the cooperation of the sprung roller C to the revolving drum, which is driven in a manner to be described later.

Fig. 5 illustrates on an enlarged scale the construction and lay-out of the guiding channel B and of the roller C. Figs 5a, 5b, and 5c are sections through the guiding channel B taken on the lines $B_a$—$B_a$, $B_b$—$B_b$, and $B_c$—$B_c$. As can be seen from the drawings, the guide B consists of a resilient strip of material or sheet metal which is supported and carried at one end only by a member 140 bridging the two bearings 133 and 134, so that the guide B is resiliently movable in a vertical direction. This guide B conducts the box strip from the scoring, grooving, and cutting device A to the drum D. In the vicinity of the former the guide is in the form of a flat strip (Fig. 5a) the breadth of which is equal to that of the band of material, and towards the drum the guide gradually acquires a channel or trough-like form, the floor 141 being of the same breadth as the floor of the finished box and the sides 142 being gradually sheared up until they are almost at right angles to the floor 141 (Fig. 5c). The box band or blank travelling through the guide B thus acquires the form indicated in Fig. 2c in which the side-pieces of the blank are bent up at right angles.

For the purpose of ensuring the contact between the box band and the floor of the guiding channel B there is provided an endless travelling belt 143 which is applied to and presses down the box band into the guide B, being itself conveyed by means of and together with the box material band or strip of blanks. This belt 143 runs on the one hand over the sprung roller C and on the other hand over a small roller 144. The axle 145 of this roller 144 is mounted in lateral bearing-like projections 146 and 147 on the bearings 133 and 134 respectively and is connected with the axle 148 of the roller C by means of arms 149, by which means the bearing system of the roller C, or more precisely the geometric axis of this roller, is caused to be rotatable about the geometric axis of the roller 144.

The range of this movement of rotation is, however, limited by the circumstance that the arms 149 grasp the guide channel B from below by means of a stirrup- or hook-shaped member 150, so that the roller C participates in the swinging movements of this guide channel but at the same time constantly extends so far with its lower end that it presses the box band on to the drum D as the same passes from the guide to the drum. This action of the roller C is reinforced by connection of the arm 149 by means of a tension spring 151 to the cam disc 156 rigidly attached to the framework 114 of the machine, whereby a sprung mounting of the roller C and an elastic pressure of the same against the outer surface of the drum D is achieved. The partly shaped box band thus passes between the roller C and the drum D on to the surface of the latter to be clamped and further shaped. The drive of the belt 143 is derived from the roller C, which is driven from the cutting roller *p* through the sprockets 198 and 196 and the chain 197.

The drum (or disc) D is mounted so as to be freely rotatable with its axle 152 in the bearings 153 and 154 attached to the framework 114 of the machine, and rotates at a uniform speed during the working of the machine; the drive will be detailed later. The drum D consists of a number of drum segments each of which is similarly equipped with the implements and devices required for the shaping, working up, and clamping of the work pieces. At each side of the drum D, opposite to the end surfaces there are provided, rigidly attached to the framework 114 of the machine by means of L- or channel-section iron members, the discs 156 (hereinafter termed "cam discs") which are disposed co-axially with the drum D, the axle 152 of the drum passing freely through the central openings 157 in the discs 156. These cam discs 156 are provided on the surface facing the end of the drum D with cam paths from which the operative movements of the implements and device disposed on the drum are derived and controlled. (These cam discs and the appropriate cam paths, which are shown in detail in Figs. 9, 9a, and 9b, are also indicated diagrammatically in Fig. 1; it must be noted that these cam discs are stationary and do not rotate with the drum).

In Fig. 8 a drum segment (104 in Fig. 1) is shown and the adjacent segment indicated. It is to be understood that all the constructional parts of the one segment also occur in the other, as also in all the remaining segments not shown in Fig. 8, since all the segments are similarly constructed; details omitted in the drawings for the sake of clarity are therefore to be assumed as existing. Fig. 9 is a section on the line II—II of Fig. 8, and Fig. 9a a section on the line I—I showing also the stationary cam discs 156; Fig. 9b is an elevation of a cam disc on the same scale as Fig. 1 or 3 as viewed from the drum.

The box band or work piece is retained laterally in position on the drum segment, which latter can be adjusted by the insertion of distancing pieces 5 (Figs. 8 and 9a), by means of guide ridges 6 (Fig. 9) on the rim of the drum. During the greater part of the forming process the work piece is further held in position by the dies 9 and 10 (Fig. 8) applied to the surfaces *m* and *l* of the box and operated by rods 11 and 12 (Figs. 8 and 9) sliding in recesses 17 and 18 in the drum. This movement is derived from the fixed cam paths 15, 54 and 16, 45 (Figs. 8 and 9) respectively, the axles 53 and 44 of the rods 11 and 12 being drawn towards the axle of the drum by the springs 25 and thus held in engagement with the cam paths 15 and 16 (and later with the cam paths 54 and 45). The lateral position of the rods and therefore also of the dies is regulated by the springs 14. In the position of rest the rods 11 and 12 are supported by the surfaces 20 upon which the receding surfaces of the nose-like portions 19 of the rods rest (see Fig. 9). Hence, the axles 53 and 44 when having left the cams 15 and 16, respectively, cannot be further drawn towards the axle of the drum, as the nose 19 impedes such a movement by supporting the rods 11 and 12. As the points where the axles 53 and 44 leave the cams 15 and 16, respectively, have the same distance from the axle of the drum as the points where they come into engagement with the cams 54 and 45, the axles 53 and 44 will easily be raised onto the cams 54 and 45. The cam paths which control the movement of the dies are, as indicated in Figs. 1 and 9b, so constructed that, upon the arrival of a box blank on the periphery of one of the drum segments, both dies 9 and 10 are at once applied to the work piece (cam paths 15 and 16); before the lid of the box is hinged up the axle 44 which carries the rod 12 is raised onto cam path 45 to run thereon whereby the die 10 is lifted and returned to its original position, and finally, after completion of the forming the axle 53 which carries the rod 11 is raised onto cam path 54 to run thereon whereby the die 9 is likewise lifted and returned to its starting position. The die 9, which is attached by the bolt 21 to the rods 11, comprises two portions, a fixed portion 22 and a movable portion 23, connected by the spring 24 (Figs. 8 and 9). When the box is liberated the portion 23 is drawn by the spring 24 towards the portion 22 and can then be withdrawn from the closed portion *k* of the box (Fig. 2*l*).

The actual forming of the work piece is effected mainly by means of the folders F and F₁ and of the head piece K, the construction and operating mechanism of which can be seen from Figs. 8 and 9a. The lever-shaped folders F are rotatably mounted at 106 (Fig. 9a) in the drum, so that their bent-over spatulate ends are capable of carrying out a movement in the direction of the axis of the drum, that is at right angles to the side surfaces of the work piece, which movement effects the tucking in of the side flaps *b* of the box (Fig. 2*e*). The movement of the folders F is controlled by the engagement of the pin 31 in the gap 30 in the folder assisted by the action of the springs 29 which draw the folders towards each other. The pin 31 is attached to a bolt 27 which is mounted in sliding bearings 26 and is caused to follow the path of the stationary cam 28 and thus to be raised or lowered according to the shape of this cam 28 (Figs. 1 and 9b) and to control the movement of the folder F through the intermediary of the pins 31. Similar in function to the folders F are the folders F₁ which fold in the side flaps in the middle portion of the blank; these folders F₁ are rotatably mounted at 109, and are normally held apart by springs 52, but are brought up on sliding rails as soon as they are required and carry out their folding movement against the action of these springs. On the bolt 27 is rotatably mounted a member 34 (Fig. 9a) forming the body of a head K which is thus raised and lowered in harmony with the movement of the folders F. The member 34 is also adapted to carry out a rotating movement about the bolt 27, which movement is controlled by a bolt 35 which is moved in a slot 36 in the head K and guided by the cam 37. The head K is provided at its upper end with a cutting edge 32 and is otherwise so formed (Fig. 8) that it can effect the folding up and turning in of the ends *d*, *e* (Fig. 2*f*).

The forming of the work piece by the folders F and by the head K (see Figs. 3 and 5) proceeds as follows:—The bolt 27 travels on to the curved cam 28 (Figs. 1 and 9b) and is lifted; the pins 31 are thus brought into the gaps or recesses 30, the springs 29 draw the folders F towards each other, so that the bent-over spatulate ends of the latter fold in the side flaps *b* of the work piece and then remain in this position, that is resting against the surfaces *e* of Fig. 2*f* as long as the pin 31 remains in the recess 30. The lifting of the bolt 27 also lifts the body 34 of the head K, with the result that the blade 32 severs the work piece at *c* (Fig. 2*e*) from the next following blank. It should be borne in mind that the middle part of line c has already been cut in the cutting device A (see the corresponding thick line in Fig. 2d), so it will be understood that the blade 32 fully severs the work piece from the following blank, although the action of the blade is confined to the outer portions of line c. On the member 34 being further lifted the surfaces d of the box are bent up by the upper shoulders 111 of the head against the folders F which are still resting against the surfaces e of the box. Since the bolt 27 together with the body 34 of the head K is still further lifted the pin 31 (Fig. 9a) is pushed out of the recess 30, and the folders F are withdrawn from the work piece into their original position. The head K, on being still further lifted bends up at right angles by means of its lower shoulder 110 the surfaces e along the folding edge g (Fig. 2g), the dies 9 and 10 serving hereby as supports. Meanwhile the bolt 35 rides on to the cam 37 so that the member 34 is partially rotated and, on being subsequently lowered, causes the head K to turn in by means of the inner surfaces of its hook-shaped extensions 112 (see Fig. 8) the end surfaces d of the work piece over the already turned up end surfaces e (Fig. 2h). The head K is then lifted anew so as to relinquish the work piece, and is thereupon returned to its starting position as a result of the falling away of the cam paths 28 and 37, whereby the share of the work of formation allocated thereto is terminated.

In Fig. 8 is also indicated the mechanism which carries out the folding up of the lid portion over the body of the box (Figs. 2i–2m). After the completion of the above-described forming of the parts of the box, and after a possible clasping or gumming thereof on the further rotation of the drum a lever 46 (Fig. 8) runs with its projection 113 onto the path of a stationary cam 47 (Figs. 1, 9a, and 9b), and thus has imparted to it a rotating movement which is transmitted, through the toothed segments 49 and 50, to the finger 51 which is rotatably mounted on the bolt 48. This finger 51, which is shown in perspective on an enlarged scale in Fig. 8a, is thus caused to pass through an aperture in the periphery of the drum and to bend up the lid portion of the box over the folder F₁ which is still in contact with the work piece; after the withdrawal of the latter folder the finger 51 folds the lid portion still further up until the latter assumes the position indicated in Fig. 2k. Since the die 9 applied to the surface m now acts as a support to the lid surface l the further movement of the finger 51 doubles up the lid along the bending line k, so that the lid assumes the position shown in Fig. 2l. The cam 47 (Figs. 1 and 9b) is so shaped that the finger 51 remains for a time in its position of greatest lift in order to support the lid from behind during the subsequent processes of gumming or clasping by the gumming or clasping device I, and during the filling of the box by the filling device L. Finally the finger 51 is withdrawn by the spring 158.

The mutual attachment of the separate surfaces of the box is effected for the end surfaces by the stationary clasping device G, which is mounted extraneous to the drum, and for the side surfaces (fastening of the fixed portion of the lid to the body of the box) by the likewise independent and stationary gumming device J (Figs. 3 and 4). It will be obvious that G could equally well be replaced by a suitable gumming device and J by any well-known fastening device.

The device G can be represented by any type of clasper capable of operating on the work piece in passing. Since the special construction required for this purpose does not belong to the subject matter of my present invention it is sufficient to state here that the implements 38 (heads and counter-heads) for performing the clasping operation are disposed adjacent the periphery of a rotating disc 39 in such a manner that they travel past the periphery of the drum D in an approximately tangential direction, and during their movement past the drum carry out the required clasping on the work piece attached to the surface of the drum. For this purpose the disc 39 is caused to rotate at such a speed that the clasping implements 38, during the time in which they are engaged upon the work of clasping, travel at approximately the same speed as the work piece, so that they are comparatively motionless in relation to the work piece in question during the period of their functioning. The clasper disc 39 is keyed to the shaft 107 which is mounted in the bearings 40 and 41 attached to the framework 114 of the machine, and is driven in a manner to be described in the further course of this specification.

The pasting device J, which is shown in Figs. 10 and 10a in longitudinal and cross section respectively, consists of a body 159 attached to and rotating with the axle 158, and adapted to dip with its ends or arms 160 periodically in the course of rotation into a suitable liquid agglutinant 161, so that these arms are moistened with this adhesive liquid. After emerging from the adhesive liquid the arms 160 approach the periphery of the drum D and are brought into contact successively with the portions of the surface of the box to be stuck together that is, with those portions of the surfaces a which thereafter are permanently coated by the flaps n (Fig. 2m). The adhesive liquid 161 is contained in a trough 162 standing in an outer container 164 filled with a hot (e. g. electrically heated) liquid 163. The outer container 164 stands on an insulating plate 165 on a cross member 166 of the framework 114, which member also carries the bearings 167 and 168 for the rotating axle 158 of the pasting device. This axle 158 is driven at a suitable speed in a manner to be described later.

Pasting devices of the type here described, that is, pasting devices applying the paste to movable flaps of a box, and including clasping means, are known and their detailed construction and operation do not constitute objects of the present invention. Hence, a detailed description of the pasting device and how paste is applied to the moved surfaces of the boxes may be dispensed with as characteristics of this invention, as in particular the disposition of the work piece on the rotating drum are not influenced by the special and known type of pasting device used.

The boxes formed on the drum and fastened by pasting or clasping are, in the example of a form of construction shown in Figs. 3 and 4, detached from the drum D in the open and empty condition and transferred to a continuously travelling conveyor belt 71. This is effected by means of a rotating disc 66 (Figs. 3 and 11) provided with suitable recesses 67 for the accommodation and retention of the lids in the open position of the latter. The box is pushed out on to the conveyor belt 71 by means of the noses 70 on the disc 66 and through a guide 68 (Figs. 12 and 13), which is provided with enclosing sides 69 and is secured by the transverse member 172 to the framework of the machine. The axle 169 of the rotating disc 66 is mounted in the bearings 170 and 171 suspended from the framework of the machine, and is driven in a manner to be described later.

The transference of the boxes on to a continuously moving conveyor belt in a direction at right angles to the direction of travel of the latter is shown in detail in Figs. 12 and 13, Fig. 13 being a plan elevation of the device shown in Fig. 12 in section. The delivery of the boxes from a guide 68 on to the belt 71 travelling in the direction of the arrows is effected over a movable snout 73, of flexible material, one end of which is secured to the guide 68 while the other end of the snout is temporarily coupled to the belt 71 so as to participate in the movement of the latter, the flexibility of material allowing such a displacement of the snout. A catch 74 connected with the snout 73 engages in notches 75 in the conveyor belt 71 causing the free end of the snout 73 to be moved in common with the belt 71 until the catch 74 is brought up against a lug 76 which is rigidly connected by means of the flat iron bar 76a with the framework of the machine and is disengaged from the notch 75, whereupon the spring 77, which is stretched between the rod 77a and the snout 73, returns the snout 73 into its original position. During the time in which the snout 73 travels with the belt 71 the box is thrust out on to the belt between two of the partitions 80 disposed thereon, the springs 78 and 79 preventing the tipping over of the box at this stage while the spring 82 attached to the flat iron bar 76a completes the pushing out of the box on to the conveyor belt. The lid is meanwhile supported by the spring 81 which is secured to a plate 173 attached to the framework of the machine. (This plate is omitted in Fig. 13 for the sake of clarity.)

Adjacent the belt 71 there is a second conveyor (filler) belt 83 likewise subdivided by partitions 84 which conveys the filling material or goods and from which the latter can be pushed or otherwise transferred into the boxes on the adjacent belt. The mechanism used for this purpose, and the detecting mechanism provided in conjunction therewith will be described in the further course of the specification.

The motive power for the different moving parts of the described box-making machine (with the exception of the conveyor belts 71 and 83) is derived from an electric motor 178 mounted on the framework of the machine. This motor drives through the intermediary of the pulley wheels 179 and 180 and of the belt 181 a shaft 182 from which the drive for the various single devices is taken. The shaft 182 is mounted in the bearings 183 and 184 attached to a bracket 184a on the framework 114 and drives the drum D through the toothed wheels 185 and 186. The axles 107, 158, and 169 of the clasping and sticking devices and of the detaching disc 66 respectively are driven from the sprocket 187 attached to the shaft 182 by a single common chain 188, which travels over the sprockets 189, 190, 191 on these shafts and over a freely rotatable guiding jockey wheel 192 mounted on the arm 193 of the framework 114. The roller axle 131 of the scoring, grooving, and cutting device A is also driven from the shaft 182 through the sprockets 194 and 195 and the chain 199. The directions of movement and rotation are indicated by arrows in Fig. 3.

Immediately behind the already described parts of the machine there is provided a device P, in which the filling of the boxes on the belt 71 with the goods or material conveyed on the belt 83 is effected, and which further comprises a detecting and rejecting device. This device P is shown in Figs. 17 and 18 in elevation and in section on the line $s_{17}$—$s_{17}$ of Figs. 4 and 17, the view-points being indicated by arrows in Fig. 4. The details shown are limited to those essential for the understanding of the coordination of this device P with the remaining parts of the machine. Fig. 16 is a diagram to Fig. 18 representing the functioning of the checking, gauging, and rejecting mechanism.

Before the box conveying belt 71 reaches the point at which it becomes laden with the boxes in the above-described manner it travels round a drum 177 of a breadth approximately equal to the sum of the breadths of the two belts 71 and 83. This drum 177 is keyed to a shaft 176 which is mounted freely rotatable in the bearings 174 and 175 attached to the framework 114 of the machine. The shaft 176 and therewith the drum 177 is rotated by means of a chain drive deriving its motive power from a shaft 204 of the electro-motor 205 through the intermediary of a belt drive 203a, the shaft 202, the sprocket wheel 203, the chain 201, and the sprocket wheel 200 keyed to the shaft 176. The motor 205 is run at a suitable speed, so that the belts 71 and 83 travel in the direction indicated by arrows in Fig. 4 at the required (mutually equal) speed. As will be seen the belt 71 is looped round the drum 177 so that no reversal thereof occurs at this point, while the filler belt 83 merely touches the roller 177 tangentially and then passes on beyond the same. The belt 71, after having been charged with the boxes, passes on in company with the belt 83 into the filling and controlling device P. After passing through and quitting the device P both endless belts travel on over various rollers, drums, and the like which are not shown in the drawings since they form no essential part of the subject matter of the present invention. For the purpose of the present specification it is sufficient to state that the two conveyor belts, after travelling along a closed circuitous path in the course of which the band 83 is laden with the goods or material to be filled into the boxes, return to the drum 177.

The filling and gauging device P is mounted in the standing frame 206, which is covered over by a plate 207 and a detachable hood 208. The filling and gauging mechanism proper is accommodated on a horizontally adjustable table 209, which is carried on rods 211 attached by means of screws 210 to the frame 206 and is adapted to be slidable on these rods by means of the guide lugs 212. The table 209 moves periodically, during the actual process of filling and gauging, at the same speed as and parallel to the belts 71 and 83, which latter travel over and can be supported by the table 209, the box conveying belt being tilted obliquely during the filling and gauging process, as can be seen from the drawings. The table 209 thus travels periodically a short distance in company with the conveyor belts, returning thereafter each time to its original position.

These movements of the table 209 are governed in the following manner. On the under side of the table 209 there is attached a toothed rod 213, which is adapted to engage periodically in a toothed wheel 214 keyed to the shaft 202. The wheel 214 is provided only as to a portion of its circumference with teeth so that the same only engages for a part of each revolution in the toothed rod 213 to move the table 209. As soon as the wheel 214 comes out of engagement with the toothed rod 213 the table 209 and with it the toothed rod 213 is returned to the initial position by the action of springs 215 inserted between the table and the frame 206, in which position the table then remains until the teeth of the wheel 214 again engage in those of the rod 213 to effect anew the forward movement of the table 209. The shaft 202, to which the partially toothed wheel 214 is attached, is mounted in bearings 216 and 217 on the frame 206 and is driven continuously in the above-described manner by the electro-motor 205.

The table 209 comprises one or more similar sets of implements (three sets are indicated in Fig. 18) each one of which is adapted to carry out the filling and gauging of one box, but which can all operate simultaneously if desired. The arrangement and functioning of one of these sets is as follows (see Figs. 17 and 18). The filling of the boxes is effected by the mere pushing across of the filling from the belt 83 into the boxes standing ready on the belt 71 by means of rams 90 operated in common by a slide 91 in conjunction with a spring 218. Each ram 90 is horizontally guided with its extension rod 243 in an opening in the slide 91, which latter is provided with a shoe 219 adapted to slide in an oblique guiding slot 220 in the covering plate 207. The slide is thus compelled during the forward movement of the table 209 to move in a direction at right angles to that of the table 209 and to thrust the rams 90 in front of it, so that the latter pushes the filling from the belt 83 into the respective boxes. Each box is meanwhile held in position on the belt 71 by means of a finger 222 which is freely rotatable about a bolt 221 attached to the table 209, and connected by a spring 223 to the body of the table 209. The boxes are held open by a rod 241 secured to the table at 242 and forming the continuation of the spring 81 shown in Fig. 12.

For the purpose of checking the filling mechanism when a box is missing from the series on the belt 71 the latter is provided with notches 85 into which nipper-levers 86 rise when a box is missing. This movement of the nipper-lever 86 is transferred by means of the lever 87, which is pivoted by the bolt 224 to the table 209 and to which the ends of the nipper-lever 86 and of the rod 95 are articulated at 225 and 236, to the rod 95, which is guided in an opening 227 in the table 209, engages in a recess 89 in the ram 90, and locks the movement of the latter. A spring 228 serves to return the described system of rods into the initial state.

The testing of the boxes for defects is carried out by means of feeler-levers 92, which are rotatably mounted on a transverse rod 229 attached to the table 209 by means of the arms 230 and 231. While the forward end of the feeler-lever 92 palpates the box the rear end of this lever is coupled by means of the link 93 to the one end of a two-armed lever 94, which is pivoted to the table 209 by the bolt 232 and to the other end of which the rod 88, guided in the opening 227, is articulated. The feeler-lever 92, on meeting with a defective box, will thus move the system of levers 93 and 94 in such a manner that the rod 88 engages in the gap 89 in the ram 90 and locks the thrusting movement of the latter.

If the movement of the ram be locked in this manner the slide 91 will nevertheless move forward in response to the tension of the spring 218, whereby a feeler 96, guided in an aperture 232 in the table 209, comes up against the rod 88 or 95 which has been pushed forward through the opening 227. As a result the lever 235, which is rotatable about a bolt 234 attached to an arm 233 of the slide 91 and to the one end of which the rear end of the feeler 96 is articulated, is caused to carry out a rotating movement and thereby with its other end, which passes through an opening 237 in a rod 97, to move this rod 97, which is guided in openings 237 and 238 in the table 209, forwards and thus to push the defective or unfilled box off the conveyor belt. Before this cycle of operations is performed the supporting finger 222 is swung back by the rod 240, which is rigidly attached to a rod 97 and guided in an opening 239 in the table 209, so that the way is opened for the backward movement of the defective box.

As has already been mentioned the arrangement and construction of the separate devices comprised in this box-making machine can be altered and modified to a very great extent without leaving the scope of the present invention. Whereas for example in the constructional examples hitherto described in this specification a coherent strip of material is caused to run on to the surface of the drum at the highest point of the latter and to be cut into separate pieces only after it has become secured to this drum the procedure could equally well be such that previously severed and trimmed portions of box blanks are brought on to the drum, and that at any desired point on the circumference, e. g. at the lowest point.

An apparatus of this kind in which ready prepared box blanks are brought up to and secured on the drum is shown in Figs. 14 and 15 in side and plan elevation respectively, only those portions of the machine being shown in the drawings as are necessary for the understanding of the spatial disposition of the feed- and attaching devices, while the remaining parts are omitted in the interests of clearness, since the construction of these parts has already been described above and the appropriate co-ordination thereof for the present purpose of the present machine is a matter presenting no particular difficulty. For the better understanding of the mechanism shown in Figs. 14 and 15 there is provided in Fig. 14a a side elevation taken on the line $s_{15}$—$s_{15}$ of Fig. 15 and in Fig. 14b a sectional view through the roller 277 taken on the line $s_{14}$—$s_{14}$ of Fig. 14.

In these latter figures 250 denotes the framework of the box-making machine which carries the bearings 251 and 252 for the axle 253 of the travelling drum D. On the framework 250, or more precisely on a bracket 270 of the same, there are secured the bearings 254 and 255 for the countershaft 258 which drives the drum D through the pinions 256 and 257, and which corresponds to the countershaft 182 in Figs. 3 and 4 and like the latter is driven by an electromotor. The stationary cam discs disposed on each side of the drum D and adapted to control the movements of the implements and devices stationed on the drum can be constructed, provided the drum D is also of similar construction, in the manner already described in connection with the box-making machine shown in Figs. 3 and 4, and these cam discs are therefore omitted in Figs. 14 and 15; it will be clear that these cam discs must be adjusted as to position and can only definitively be fixed in a certain relation to the position on the drum at which the box blanks first make contact with and are attached to the surface of the drum, since from this position the forming of the boxes or box parts must be arranged to commence. This position is in Fig. 14 the lowest point of the drum at any one moment, and in Fig. 3 the culminating point.

To the framework 250 of the machine there is attached a horizontal plate 259 on which the separate blanks are deposited either mechanically or by hand and likewise brought up to a pair of revolving rollers 260 and 261. The work piece (box blank) is grasped by and drawn through these rollers and then conducted on a belt 262, which runs over the lower roller 260 and the applying roller 263 (corresponding to the roller C in Fig. 3), to the drum D, the side portions of the work piece being meanwhile bent up in a manner to be described later. The axles 264 and 265 of the superimposed rollers 260 and 261 are mounted in bearings 266 and 267 attached to the framework 250 similarly to the axles of the rollers p and q of the scoring, grooving, and cutting device A shown in Figs. 3, 4, and 5 and are provided with pinions 300 and 301, which are in engagement with each other and effect the driving of the axle 265 from the axle 264. To avoid displacement of the work piece on the conveyor belt 262 there is provided immediately above this belt a second belt 268, which travels round the upper roller 261 and the roller 269, and the under side of which runs parallel with and at the same speed as the belt 262, so that the box blank is conveyed between the two belts at a uniform speed towards the drum D and is protected against deformation. The belt 262 travels through that portion of its course through which it conveys the work piece over a table 273, which is downwardly inclined towards the drum D, is secured in the framework 250 by means of angle irons 271 and bracing 272, and serves as an underlying support for the belt 262 and for the work piece. On the side surfaces of this table 273 there are attached arms 274 and 275 in which the axle 276 of the roller 269 is mounted.

For the bending up of the side surfaces of the box blank (work piece) there is provided a roller (edging roller) 277, the outer track rims 278 of which are so formed that they effect the turning up at right angles of the box sides. Over the inner (intermediate) portion of the roller the belt 268 runs touching this portion 279 tangentially, so that this roller revolves at the same speed as the roller 261 and the roller 269. Beneath the edging roller and mounted by means of screwed bolts 280 and 280a there are provided small wheels 281 and 281a, which press from the inside against the bending lines and thus cooperate in the bending up of the sides of the box. The axle 282 of the edging roller 277 is mounted in vertically slidable shoes 283 and 283a pressed downwards by the action of springs 284 and 284a on arms 285 and 286 attached to the table 273. The applying roller 263 which cooperates in the feeding of the box blank on to the drum D is likewise mounted with its axle 287 under spring action, so that this roller is constantly pressed against the drum. In each of the bearings 290 and 291, which are attached to the brackets 288 and 289 of the framework of the machine, there is provided a sliding shoe 292, 293, into which the axle 287 is fitted and on which a spring 294, 295 is brought to bear.

The drive of the moving parts of the feed and attaching device shown in Figs. 14 and 15 is derived from the above-mentioned countershaft 258. On this shaft and on the axles 260 and 287 there are provided chain sprocket wheels 296, 297, and 298 respectively, which sprocket wheels are connected by a common chain 299.

In the box-making machine provided by the present invention the filling of the boxes can be carried out during the time in which the boxes are still attached to the travelling table or travelling drum. In this case the filling device must be included among the devices grouped along the path of the travelling table (or drum). The filling operation is then performed on the work piece as the latter travels past the device.

A filling device particularly well suited for this purpose, which is particularly intended for use in connection with granular filling material, and is located near the end-point of the rotating drum, is shown in Figs. 19 and 20 in side and plan elevation respectively. Fig. 19a is a diagram of this device, which is also indicated in a semi-diagrammatic manner in Fig. 1 (as filling device L).

This device consists essentially of a revolving star- or cross-wheel 302, the arms of which take the form of channel- or cylindrical guides 56. The axle 303 of the star-wheel 302 is mounted at one side only in the bearing 304 secured to the framework 306 of the box-making machine. The lay-out is such that this star-wheel 302 is located at the end-point of the drum D, which latter is mounted, as in the case of the previously-described examples, with its axle 307 in the bearings 308 and 309 built into the framework 306 of the machine, and can be constructed in precisely the same manner as the corresponding drum in the previously-described examples of machines.

The filling material is emptied into the container 55, which serves as the feeding hopper or guide for the filling material and is attached to the covering plate 310, which in its turn is attached to the bearing 314. From the container 55 the filling material passes through an opening 311 in the same and through an opening in the covering plate 310 into the guiding channels 56. These latter guides are provided with sliding plungers 57, the bolts 58 of which are compelled to follow a curve, for example a circular path, and the plungers thus alternatingly push the filling material out of the guide channels. For this purpose the bolts 58 project into openings in a revolving disc 312, which thus compels the plunger bolts 58 and the plungers 57 to describe a circular course about the axis of rotation of the disc 312. The shaft 313 to which the disc 312 is keyed is mounted eccentrically in regard to the axis of the star-wheel 302 in the bearing 314 attached to the framework 306 of the machine, and is permanently driven in any desired manner, for example by means of a belt drive 313a. Through the intermediary of the plunger bolts 58 the revolving disc 312 also effects the rotation of the star-wheel 302. At the ends of the guide channels 56 there can be provided flaps 60, which are normally retained in the closed condition by the springs 61, but which are opened during the ejection of the filling material.

Figs. 21, 22, and 21a show in side and plan elevation respectively and on an enlarged scale a device for the closing of the filled box, which may still be attached to the drum, and, in the latter event, for the detachment of the filled box from the drum. (This device is also indicated diagrammatically in Fig. 1). In these figures D again denotes the drum which carries the work piece, and which is mounted with its axle 315 in the bearings 317 and 318 attached to the framework 316 of the machine. In the vicinity of the drum D there is rigidly attached to the framework by means of the holder 319 the closer N, which constitutes a guide for the boxes detached from the drum, and is provided on its upper side with a slot 320 (see also the cross sections of the closer N taken on the lines Na—Na and Nb—Nb, and shown in Figs. 21b and 21c). On its under side the closer N is provided with a tongue-shaped projection 62, which engages in a groove 63 (see Figs. 9 and 9a) in the outer casing of the drum beneath the box, and thereby grasps the box from below, detaches the latter which is now only held by the guides 6 (Fig. 9), and induces the same into the closing device N. Above the closer N there rotates a disc 65, the shaft 321 of which is carried in the bearings 322 and 323 attached to the framework 316 and can be driven in any desired manner, e. g. from the countershaft of the box machine (not shown in Figs. 21 and 22) by means of the chain drive 324. The arms 64 of the rotating disc 65 are inserted consecutively into the slot 320 in the closer N and push the box, which is closed by the same operation, through the detaching and closing device N on to a conveyor belt or on to a stack of boxes (not shown in these figures of the drawings).

If the box is not filled in situ on the drum, but transferred in the open and empty condition in the above-described manner on to the conveyor belt 71 (Figs. 3 and 4) and further transported by the latter, the process of filling can be carried out directly from the machine producing the filling material on to this band 71. An arrangement of the parts for this purpose is shown in Figs. 23 and 24 in a side and plan view respectively, 325 denoting the machine producing the filling material (not shown in detail since the same forms no part of the present invention) and 326 an opening in this machine through which the filling material is directly emptied into the boxes as the latter pass under this opening 326 on the belt 71.

The complete box-making machine described with reference to the drawings, as also the individual component parts and subsidiary devices for box-making machines described and illustrated, represent merely specialized examples, since the choice, shaping, and grouping of the separate implements and subsidiary devices require to be adapted to the demands of the moment according to the nature and form of the goods to be produced therewith and according to the procedure to be followed. The drum may for instance be arranged to rotate about a vertical axis and the work-centers (sectors) be disposed on the end surfaces of the drum. The travelling work-base can be adapted to carry out any desired straight or curved, progressive or reciprocal movement. The box or box portion may be removed from the work-base in a semi-finished state or may be filled while still attached thereto. Any desired fastening, gumming, bandaging, or other devices may be incorporated. All such machines come within the scope of the invention provided they exhibit the characteristic feature stated.

The machine provided by my invention is also capable of producing sliding, overlapping, dressed, and many other types of boxes.

I claim:—

1. In a machine for making boxes or box parts of cardboard or the like, a movable body, a work-base being part thereof and immovable in relation thereto, at least one pressure member movably arranged on and in relation to the body and adapted to hold fast a work piece on and in relation to the said work-base, a set of box-forming tools including a tool mounted on the said body and adapted to fold up the work piece held fast on the base against a side surface of the said pressure member, and means for moving the said body during the folding-up operation of the said tool.

2. In a machine for making boxes or box parts of cardboard or the like, a movable body, a work-base being part thereof and immovable in relation thereto, at least one pressure member movably arranged on and in relation to the body and adapted to hold fast a work piece on and in relation to the said work-base, a set of box-forming tools including a tool mounted on the said body independently of the said pressure member and adapted to fold up the work piece held fast on the base against a side surface of the said pressure member, and means for moving the said body during the folding-up operation of the said tool.

3. In a machine for making boxes or box parts of cardboard or the like, a movable body, a work-base being part thereof and immovable in relation thereto, at least one pressure member movably arranged on and in relation to the body and adapted to hold fast a work piece on and in relation to the said work-base, a set of box-forming tools including a tool mounted on the said body independently of the said pressure member and adapted to fold up the work piece held fast on the base against a side surface of the said pressure member, and means for maintaining the said body in continuous movement.

4. In a machine for making boxes or box parts of cardboard or the like, a rotary body, a work-base being part thereof and immovable in relation thereto, at least one pressure member movably arranged on and in relation to the body and adapted to hold fast a work piece on and in relation to the said work-base, a set of box-forming tools including a tool mounted on the said body and adapted to fold up the work piece held fast on the base against a side surface of the said pressure member, and means for rotating the said body during the folding-up operation of the said tool.

5. In a machine for making boxes or box parts of cardboard or the like, a drum subdivided into a plurality of sections each comprising a work-base being part thereof and immovable in relation thereto, at least one pressure member movably arranged on and in relation to each of said sections and adapted to hold fast a work piece on and in relation to the said work-base, and a set of box-forming tools including a tool mounted on the respective section of the drum independently of the said pressure member and adapted to fold up the work piece held fast on the base against a side surface of the said pressure member, and means for rotating said drum during the folding-up operation of the tools.

6. In a machine for making boxes or box parts of cardboard or the like, a movable body, a work-base being part thereof and immovable in relation thereto, at least one pressure member movably arranged on and in relation to the body and adapted to hold fast a work piece on and in relation to the said work-base, a set of box-forming tools including a tool mounted on the said body independently of the said pressure-member and adapted to fold up the work piece held fast on the base against a side surface of the said pressure member, means for moving said body during the folding-up operation of the said tool, and stationary guides adapted to initiate and control the box-forming movements of the tools.

7. In a machine for making boxes or box parts of cardboard or the like, a drum, a work-base being an immovable part of the cylindrical outer surface of said drum, at least one pressure member movably arranged on and in relation to said drum and adapted to hold fast a work-piece on and in relation to the said work-base, a set of box-forming tools including a tool mounted on the said drum independently of the said pressure member and adapted to fold up the work piece held fast on the base against a side surface of the said pressure member, and means for continuously rotating the drum during the box-forming operation of the tools.

8. In a machine as claimed in claim 5, supports for the work pieces, said supports being adjustably mounted on the drum for displacement in radial directions so as to change the distance between the work pieces and the axis of the drum.

9. In a machine for making boxes or box parts of cardboard material or the like, a drum, a feeding device comprising a spring roller and adapted to convey a band of material onto the drum, a cutter arranged on the said drum and adapted to sever a work piece from the band of material, a work-base being an immovable part of the cylindrical outer surface of said drum and adapted to receive the severed work piece, at least one pressure member movably arranged on and in relation to the drum and adapted to hold fast the work-piece on and in relation to the said work-base, a set of box-forming tools including a tool mounted on the drum independently of the said pressure member and adapted to fold up the work piece held fast on the base against a side surface of the said pressure member, and means for continuously rotating the drum during the box-forming operation of the tools.

10. In a machine for making boxes or box parts of cardboard or the like, a drum, a work-base being an immovable part of the cylindrical outer surface of said drum, means on said drum for holding fast a work piece in relation to said work-base, said means comprising lateral guides permitting the work piece to be held fast therebetween and at least one member movably arranged on and in relation to the drum and adapted to press the bottom of said work piece onto the said work-base, a set of box-forming tools including a tool mounted on the drum independently of the said holding means and adapted to fold up the work piece held fast on the base against a side surface of the said member, and means for continuously rotating the drum during the folding-up operation of said tool.

11. In a machine for making boxes or box parts of cardboard or the like, a movable body, a work-base being part thereof and immovable in relation thereto, at least one pressure member movably arranged on said body beside the work-base and adapted to be put into operative position over the work-base so as to hold fast a work piece thereon, a set of box-forming tools including a tool mounted on said body and adapted to fold up the work piece held fast on the base against a side surface of the said pressure member, and means for moving the said body during the folding-up operation of the said tool.

12. In a machine for making boxes or box parts of cardboard or the like, a movable body, a work-base being part thereof and immovable in relation thereto, two pressure members movably arranged beside the work-base on opposite sides thereof and adapted to be positioned side by side over adjacent parts of the work-base so as to hold fast a work piece thereon, a set of box-forming tools including a tool mounted on said body and adapted to fold up the work piece held fast on the base against a side surface of said pressure members, and means for moving the said body during the folding-up operation of the said tool.

13. In a machine as claimed in claim 12, stationary guides for controlling the movements of the said two pressure members independently from one another.

14. In a machine for making boxes or box parts of cardboard or the like, a movable body, a work-base being part thereof and immovable in relation thereto, at least one pressure member movably arranged on and in relation to the body and adapted to hold fast a work piece on and in relation to the said work-base, a set of box-forming tools including a tool mounted on the said body independently of the said pressure member and adapted to fold up the work piece held fast on the base against a surface of the said pressure member and to turn in thereafter the front surface of the work piece, and means to move the said work-base during the box-forming operation of the tools.

15. In a machine for making boxes or box parts of cardboard or the like, a drum, a work-base being part thereof and immovable in relation thereto, at least one pressure member movably arranged on and in relation to said drum and adapted to hold fast a work piece on and in relation to the said work-base, a set of box-forming tools mounted on the drum independently of the said pressure member and comprising a folder-member and a tool, both cooperatively interconnected so as to bend up and turn in surfaces of the work piece held fast on the base, and means for rotating said drum during the box-forming operations of the tools.

16. In a machine for making boxes or box parts of cardboard or the like, a drum, a feeding device adapted to convey a band of material onto the drum, a tool mounted on said drum and provided with a cutter for severing a work piece from the band of material and with projections adapted to bend up and turn in the front surfaces of the work piece, means for holding fast the work piece on the drum, and means for continuously rotating the drum during the operations of the said head-like tool.

17. In a machine as claimed in claim 1, the combination therewith of a taking-off device mounted outside the said work-base for removing work pieces therefrom.

18. In a machine for making boxes or box parts of cardboard or the like, a drum, a circumferential groove on the outer periphery of said drum, means on the drum for holding fast a work piece thereon so as to cover the said groove, a set of box-forming tools mounted on said drum and adapted to operate on the work piece held fast, means for continuously rotating the said drum, and a taking-off device including a stationary tongue engageable into the said groove, whereby a work piece held fast on the drum, when abutting against said tongue, is removed from the drum.

19. In a machine for making boxes or box parts of cardboard or the like, a drum, means thereon for holding fast a work piece, a set of box-forming tools mounted on said drum and adapted to operate on the work piece held fast, means for continuously rotating the drum, and a taking-off device adapted to remove the finished work piece from the rotating drum, said taking-off device having a stationary channel-like member of decreasing height, for permitting the removed and finished work piece to be passed through and to be closed thereby.

20. In a machine as claimed in claim 19, the combination therewith of means for pushing the finished work piece from the rotating drum through the said channel-like taking-off device.

21. In a machine for making boxes or box parts of cardboard or the like, a drum, means thereon for holding fast a work piece, a set of box-forming tools mounted on said drum and adapted to operate on the work piece held fast, means for continuously rotating the drum, a taking-off device adapted to remove open boxes from the drum without closing them, said taking-off device comprising a rotary body provided with recesses adapted to engage with the raised lid of the open box, means for rotating said rotary body, a conveyor, and means for pushing the open box from the said rotating body onto the said conveyor.

22. In a machine as claimed in claim 1, the combination therewith of a box-filling device arranged so as to receive the boxes detached from the said work-base continuously.

23. In a machine as claimed in claim 1, the combination therewith of a box-filling device arranged so as to receive the boxes detached from the said work-base continuously, said filling device, comprising a conveyor-band for carrying the boxes, a second conveyor band for carrying the filling material, means for moving both bands, and means for transferring the filling material from its conveyor into the boxes carried by the first mentioned conveyor band during the movement of both bands.

24. In a machine as claimed in claim 1, the combination therewith of a mechanism for detecting faulty boxes, a box-filling device arranged so as to receive the boxes detached from the said work-base continuously, and control means adapted to stop said box-filling device when a faulty box is detected by the said mechanism.

25. In a machine as claimed in claim 1, the combination therewith of a conveyor band arranged so as to receive and carry on without interruption the finished unfilled boxes detached from the said work-base, a second conveyor band for carrying the filling material, means for moving both bands, a filling device for transferring the filling material from its conveyor band into the boxes carried by the first mentioned conveyor band during the movement of both bands, a mechanism arranged near the band carrying the boxes and provided with touch levers to detect faulty boxes before being filled, and control means for mechanically connecting the said mechanism with the said filling device so as to stop the latter when a faulty box is to be filled.

26. In a machine as claimed in claim 1, the combination therewith of a conveyor band for carrying the finished unfilled boxes, said band being provided with holes, a second conveyor band for carrying the filling material, means for moving both bands, a filling device for transferring the filling material from its conveyor band into the boxes carried by the first-mentioned band during the movement of both bands, a mechanism arranged near the band carrying the boxes and provided with touch levers adapted to enter from below through the said openings to detect the absence of boxes on the band, and control means for mechanically connecting the said mechanism with the said filling device so as to stop the latter when the absence of a box has been detected.

27. In a machine as claimed in claim 1, a spring-controlled nose of flexible material and means for coupling said nose to the moving conveyor whenever a box is pushed onto the latter.

28. In a machine as claimed in claim 1, the combination therewith of a mechanism for detecting faulty boxes, a box-filling device, a removing device arranged so as to receive and carry on without interruption faulty boxes detached from said work-base, and control means adapted to stop said box-filling device when a faulty box is detected by the said mechanism and to cause the said removing device to carry off the faulty box.

VIKTOR CZERWENY.